United States Patent
Toukura et al.

(10) Patent No.: US 6,306,062 B1
(45) Date of Patent: Oct. 23, 2001

(54) DRIVING FORCE CONTROL WITH GRADIENT RESISTANCE TORQUE DEPENDENT CORRECTION FACTOR

(75) Inventors: Nobusuke Toukura, Kanagawa; Hiroaki Nishijima; Masayuki Yasuoka, both of Yokohama, all of (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 09/518,691

(22) Filed: Mar. 3, 2000

(30) Foreign Application Priority Data

Mar. 5, 1999 (JP) ................................................. 11-058289

(51) Int. Cl.⁷ .................................................... B60R 41/04
(52) U.S. Cl. ............................... 477/107; 477/110; 701/58
(58) Field of Search .............................. 477/47, 901, 97, 477/107; 701/55, 58

(56) References Cited

U.S. PATENT DOCUMENTS

| | | | |
|---|---|---|---|
| 4,720,793 | 1/1988 | Watanabe et al. | 364/424.1 |
| 5,364,321 | * 11/1994 | Togai et al. | 477/42 |
| 5,728,026 | 3/1998 | Sakaguchi et al. | 479/110 |
| 5,806,009 | * 9/1998 | Horiguchi | 701/58 |
| 5,832,400 | * 11/1998 | Takahashi et al. | 701/53 |

FOREIGN PATENT DOCUMENTS

| | | |
|---|---|---|
| 0 899 149 | 3/1999 | (EP). |
| 9-242862 | 9/1997 | (JP). |
| 9-287502 | 11/1997 | (JP). |
| 168405 | * 6/2000 | (JP). |

* cited by examiner

Primary Examiner—Sherry Estremsky
Assistant Examiner—Tisha D. Lewis
(74) Attorney, Agent, or Firm—Foley & Lardner

(57) ABSTRACT

A driving force control system for an automotive vehicle comprises a controller. The controller determines standard resistance (RLDTRQ) in response to vehicle speed (VSP), and it also determines an increment in running resistance (RESTRQ) from the standard resistance (RLDTRQ). The controller determines driving force correction (ADDFD) in response to the increment in running resistance (RESTRQ). The controller adds the driving force correction (ADDFD) to ordinary target driving force (tTd#n) to provide corrected target driving force (tTd). The controller converts the increment in running resistance (RESTRQ) into the driving force correction (ADDFD) at a rate that is variable in response to the increment in running resistance (RESTRQ).

13 Claims, 7 Drawing Sheets

DRIVING FORCE CONTROL WITH GRADIENT RESISTANCE TORQUE DEPENDENT CORRECTION FACTOR

FIELD OF THE INVENTION

The present invention relates to a driving force control for an automotive vehicle.

BACKGROUND OF THE INVENTION

The term "standard resistance" or "standard running resistance" is herein used to mean any force which opposes the motion of an automotive vehicle which is driven to keep rolling over the surface of a flat road having 0% gradient at a constant vehicle speed. The term "running resistance" is herein used to mean any force that opposes the motion of an automotive vehicle which is driven to keep rolling over the surface of a road at a constant vehicle speed. Running resistance is equal to standard resistance if an automotive vehicle is driven to keep rolling over the surface of a flat road having 0% gradient at a constant vehicle speed. Running resistance increases and becomes greater than standard resistance if the automotive vehicle is accelerated to increase speed from the constant vehicle speed. The term "acceleration resistance" is herein used to mean this increment or difference in running resistance that has occurred due to acceleration. Running resistance is greater when the automotive vehicle is driven to keep rolling over the surface of a flat road having gradient greater than 0% at a constant vehicle speed than standard resistance for the same vehicle speed. The term "gradient resistance" is used to mean this increment or difference in running resistance.

On an ascending road, running resistance that opposes the motion of an automotive vehicle increases due to road gradient, so that the vehicle operator would feel a lack of acceleration if driving force for a flat road having 0% gradient were kept. Accordingly, the operator manipulates an accelerator pedal to cause a power train including an internal combustion engine and an automatic transmission to increase its driving force.

JP-A 9-242862 and JP-A 9-287502 disclose driving force control systems that estimate road gradient and cause a power train to alter its driving force in response to the estimated road gradient.

JP-A 9-242862 teaches selecting appropriate one of different ratio change patterns of an automatic transmission in response to road gradient for timely adjustment to an increase in running resistance caused by the road gradient.

JP-A 9-287502 teaches varying an increase in target engine torque in proportion to an increase in running resistance over the whole variation of the increase in running resistance.

The above-mentioned driving force control systems are satisfactory to some extent. However, a need remains to develop a driving force control system in such a direction as to determine a correction in amount of driving force in response to operator demand on the motion of an automotive vehicle relative to the surface of an ascending road as well as an increase in running resistance due to the road gradient.

An object of the present invention is to provide a driving force control for an automotive vehicle, which provides a good ride feel to meet operator demand on the motion of an automotive vehicle relative to the surface of an ascending road.

SUMMARY OF THE INVENTION

According to one aspect of the present invention, there is provided a driving force control system for an automotive vehicle having an accelerator pedal, an engine, and an automatic transmission, comprising:

an ordinary target driving force generator generating ordinary target driving force in response to operator manipulation of the accelerator pedal and vehicle speed;

a running resistance increment generator including a standard resistance generator that generates standard resistance, said running resistance increment generator being operative to determine an increment in running resistance from said standard resistance;

a driving force correction generator converts said increment in running resistance into said driving force correction over a portion of variations of said increment in running resistance at a rate that is variable in response to said increment in running resistance;

a corrected driving force generator determining corrected target driving force by adding said driving force correction to said ordinary target driving force;

a target engine torque generator generating a target engine torque in response to said corrected target driving force; and a target ratio generator generating a target ratio in response to said corrected target driving force.

According to another aspect of the present invention, there is provided a driving force control system for an automotive vehicle having a power train including an internal combustion engine and a continuously variable transmission (CVT), and a controller that determines an increment in running resistance derived from road gradient, determines a driving force correction in response to the determined increment in running resistance, and corrects a target driving force applied to the power train with the driving force correction, wherein said controller determines said driving force correction in response to operator demand on motion of the automotive vehicle relative to the surface of a road as well as said increment in running resistance.

DESCRIPTION OF THE PREFERRED EMBODIMENTS

Figure 1:
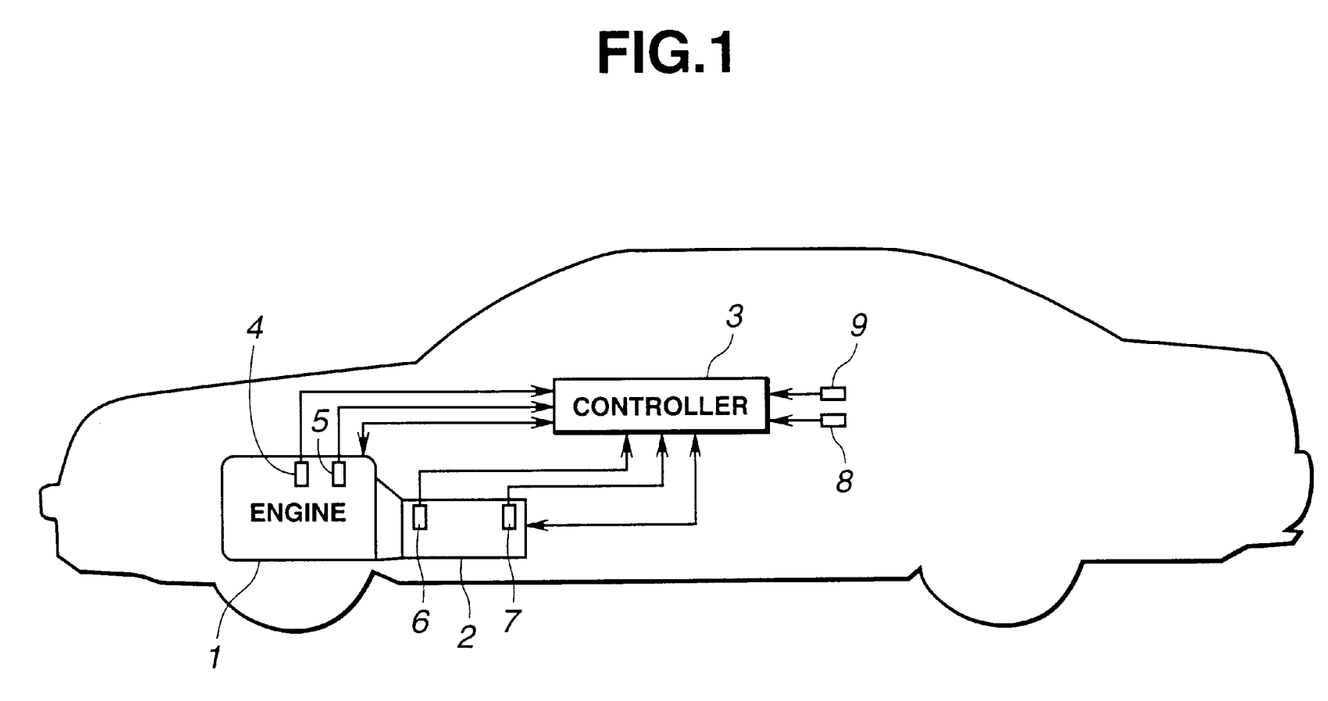
FIG. 1 is a block diagram of an automotive vehicle having driving wheels, a power train including an engine and an automatic transmission, and a controller.

Referring to the accompanying drawings, FIG. 1 is a schematic view of a motor vehicle installed with a driving force control system implementing the present invention.

The motor vehicle has an engine 1, an automatic transmission 2, and a controller 3. Output from the engine 1 is transmitted via the automatic transmission 2 to driving wheels. The controller 3 performs an integral control over the engine 1 and automatic transmission 2.

To adjust output from the engine 1, an electronically controlled throttle valve is disposed in an intake passage of the engine. An actuator, in the form of a motor, for example, activates the throttle valve to open the valve in degrees, controlling intake airflow rate to the engine, thus controlling output torque of the engine 1. The automatic transmission 2 may be in the form of an automatic transmission having discrete speed ratios or a continuously variable transmission (CVT). The CVT includes a belt type CVT and a toroidal type CVT.

Attached to the engine 1 are a crankshaft angle sensor 4 and a throttle opening degree sensor 5. The crankshaft angle sensor 4 is used to determine engine speed. The throttle opening degree sensor 5 is used to determine degree of opening of the throttle valve within the intake passage. Attached to the transmission 2 are an input shaft speed sensor 6 and an output shaft speed sensor 7. The input and output shaft speed sensors 6 and 7 are used to determine speed of the transmission input shaft and that of the transmission output speed, respectively. Output signals from these sensors 4, 5, 6, and 7 are fed to the controller 3. In addition, an accelerator sensor 8 and a vehicle acceleration sensor 9. The accelerator sensor 8 is used to determine operator's manipulation of an accelerator pedal. The vehicle acceleration sensor 9 is used to determine acceleration to which the vehicle is subject to. Output signals from these sensors 8 and 9 are also fed to the controller 3.

The controller 3 includes a microprocessor and memories. The controller 3 determines operating state of a vehicle based on the signals fed thereto and controls fuel injection quantity, ignition timing and intake airflow rate of the engine 1 and speed ratio of the transmission 2.

Concretely, for driving on a flat road (with 0% gradient), the controller 3 determines and sets an ordinary target value of driving force in response to detected operator's manipulation of an accelerator and vehicle speed. It outputs commands to the engine 1 and transmission 2 so that the determined ordinary target value of driving force is accomplished. In operating state, such as driving on an ascending road, where running resistance increases, the controller 3 corrects the ordinary target value of driving force to cope with the increase in running resistance, thus keeping acceleration high enough to meet the operator's demand.

Figure 2:
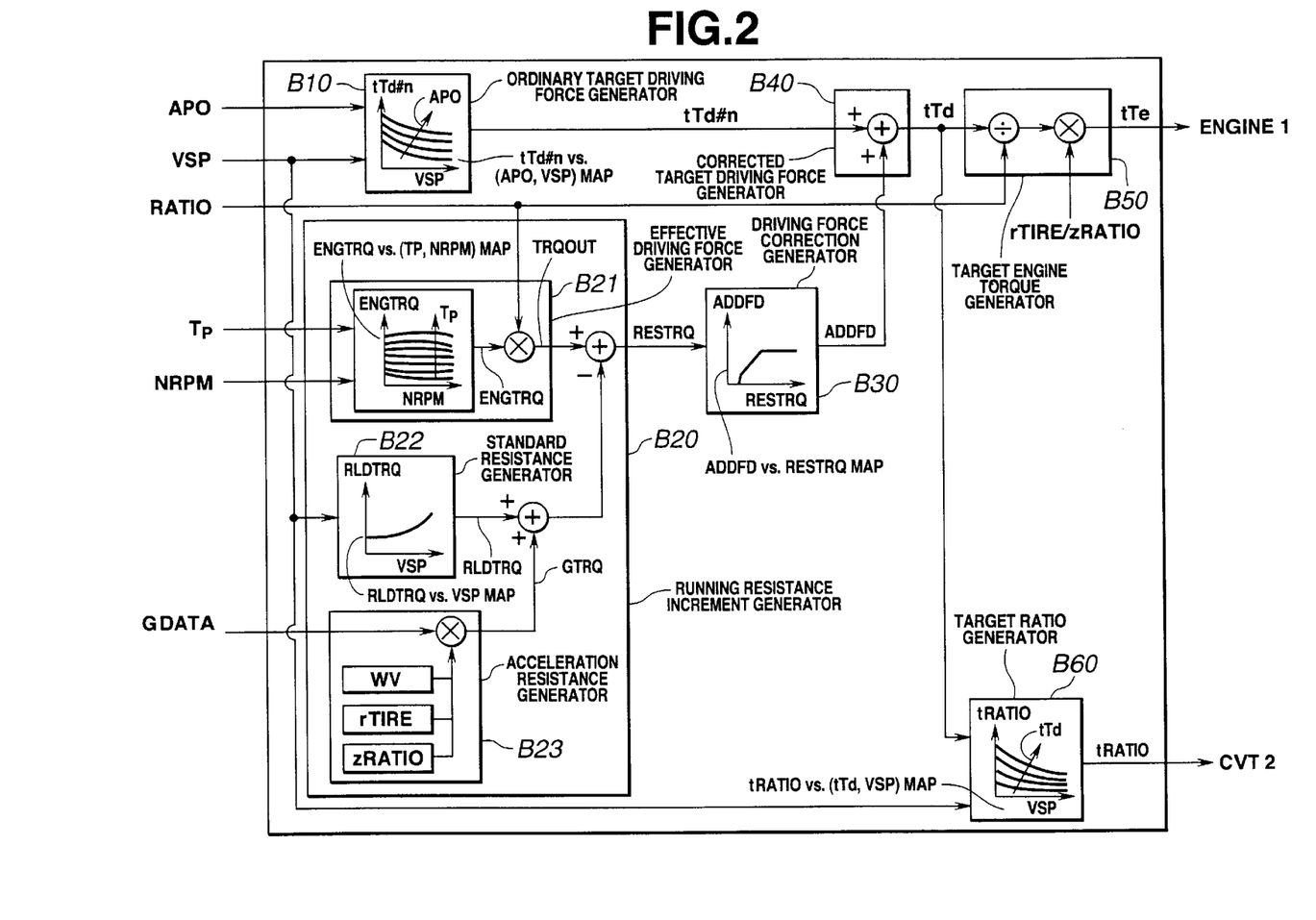
FIG. 2 is a control diagram implementing the present invention.
Figure 3:
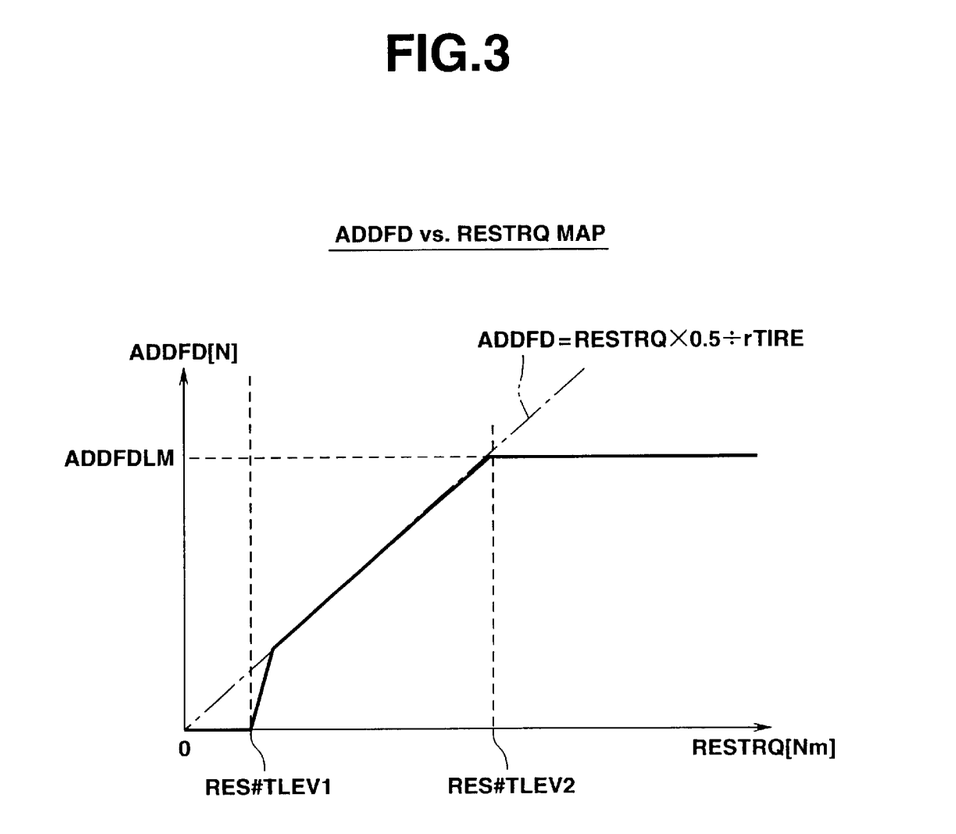
FIG. 3 is a graphical representation of a characteristic of variation of a driving force correction (ADDFD) against variation of an increment in running resistance (RESTRQ).
Figure 4:
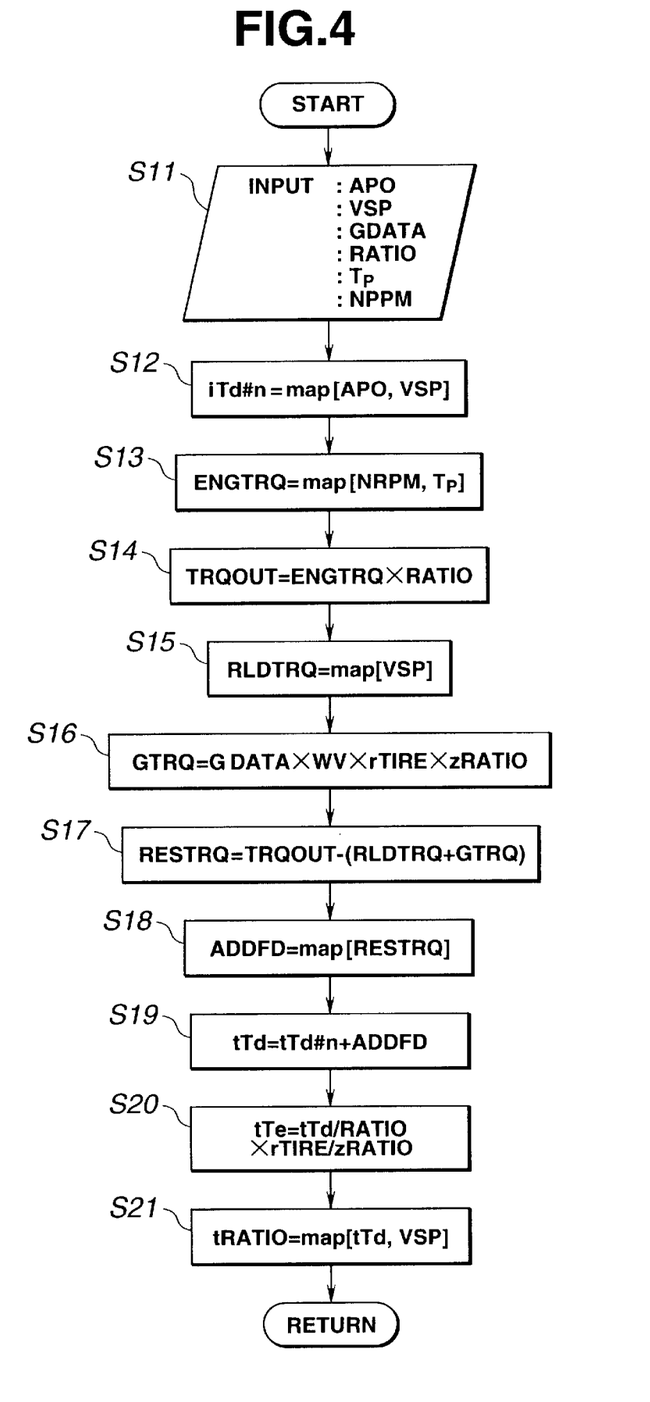
FIG. 4 is a flow chart of a control routine implementing the present invention.

Referring now to FIGS. 2 to 4, description is made on driving force control carried out by the controller 3.

FIG. 2 is a block diagram of a portion of the controller 3, illustrating a driving force control system. The driving force control system includes an ordinary target driving force generator (OTDFG) B10, a running resistance increment generator (RRIG) B20, a driving force correction generator (DFCG) B30 a corrected target driving force generator (CTDFG) B40, a target engine torque generator (TETG) B50, and a target speed ratio generator B60.

The OTDFG B10 inputs information as to operator's manipulation of accelerator APO from the accelerator sensor 8 and also information as to vehicle speed VSP [m/s] from the output shaft speed sensor 7. The OTDFG B10 includes a memory storing a predetermined map that defines various values of ordinary target driving force tTd#n [N] needed for driving the vehicle on a flat road (with 0% gradient) at various values of constant speed VSP with various values of constant operator's manipulation of accelerator APO. The OTDFG B10 performs a table look-up operation of the map using the input information as to APO and VSP to determine an ordinary target driving force tTd#n [N] and provides the determined ordinary target driving force tTd#n [N] to the corrected target driving force generator B40.

The RRIG B20 includes an effective driving force generator (EDFG) B21, a standard running resistance generator (SRG) B22, and an acceleration resistance generator (ARG) B23.

The EDFG B21 inputs information as to fuel injection quantity TP supplied to the engine 1 and information as to engine speed NRPM from the crankshaft angle sensor 4. The EDFG B21 includes a memory storing a predetermined map that defines various values of ideal output torque of the engine 1 against various combinations of values of TP and values of NRPM. The EDFG B21 performs a table look-up operation of this map using the input information TP and NRPM thereto to determine an ideal engine output torque ENGTRQ [Nm]. It multiplies the determined ideal engine output torque ENGTRQ [Nm] with a speed ratio RATIO of the transmission 2 to give an ideal output shaft torque TRQOUT [Nm] of the transmission 2.

The SRG B22 inputs information as to vehicle speed VSP resulting from calculation on output shaft speed of the transmission 2. The SRG B22 includes a memory storing a predetermined table that defines various value of standard running resistance torque RLDTRQ [Nm] against various values of vehicle speed VSP. The value of TLDTRQ [Nm] becomes larger as the value of VSP becomes higher.

The ARG B23 inputs information as to vehicle acceleration GDATA [m/s$^2$]. Information as to vehicle weight WV [kg], a tire radius rTIRE [m] and final reduction ratio zRATIO is stored as reference data in the ARG B23. The ARG B23 determines an acceleration resistance torque GTRQ [Nm] as a product of GDATA, WV, rTIRE, and zRATIO as expressed by the following equation;

$$\text{GTRQ} = \text{GDATA} \times \text{WV} \times \text{rTIRE} \times \text{zRATIO} \tag{1}$$

The RRIG B20 calculates a sum of standard running resistance torque RLDTRQ and acceleration resistance torque GTRQ and subtracts the sum from ideal output shaft torque TRQOUT to give a running resistance increment RESTRQ [Nm]. The RRIG B20 provides the RESTRG to the DFCG B30. Running resistance increment RESTRQ can be expressed by the following equation;

$$\text{RESTRQ} = \text{TRQOUT} - (\text{RLDTRQ} + \text{GTRQ}) \tag{2}$$

The DFCG B30 includes a memory storing data in a table as illustrated in FIG. 3 and performs a table look-up operation of the stored data using the running resistance increment RESTRQ to determine a driving force correction ADDFD [N]. The DFCG B30 provides the determined ADDFD to the CTDFG B40.

The fully drawn interconnected line segments shown in FIG. 3 illustrate a first preferred implementation of the present invention. Gradients of the line segments are different from each other. In other words, a ratio of driving force increment ADDFD against an increase in running resistance increment RESTRQ (gradient) varies depending on the magnitude of a value of RESTRQ.

Specifically, over values of RESTRQ not greater than a first predetermined value RES#TLEV1, the rate is zero so that zero is set as ADDFD. The first predetermined value RES#TLEV1 takes any one of values ranging from 10 to 30 [Nm], which range of values are equivalent to 2% gradient of road. During operation of the vehicle when RESTRQ is less than or equal to the first predetermined value RES#TLEV1, no correction in driving force takes place, thus preventing occurrence of any unexpected driving force correction due to, for example, an error in calculating RESTRQ, a small variation in wind against the vehicle or a small variation in running resistance derived from a gradual gradient change.

Next, over values of RESTRQ greater than RES#TLEV1 but not greater than a second predetermined value RES#TLEV2, the driving force correction ADDFD can be expressed as:

$$ADDFD = RESTRQ \times 0.5 / rTIRE \quad (3).$$

In this equation, RESTRQ is divided by tire radius rTIRE for conversion from torque [Nm] to force [N], and 50% of RESTRQ is converted into ADDFD. In this example, 50% of RESTRQ has is converted, this percentage is not limited to 50%. This value may differ depending upon characteristics of vehicles. Preferably, this value is chosen from values ranging from 30% to 70%. The remaining portion of RESTRQ left unconverted is not translated into ADDFD, leaving a room for the vehicle operator to participate the driving force correction by depressing the accelerator pedal, thus providing a natural acceleration fit to the vehicle operator's demand.

Over values of RESTRQ greater than RES#TLEV2, the driving force correction ADDFD is kept at a predetermined value ADDFDLM. The setting is such that, with the running resistance increment at the second predetermined value RES#TLEV2, increasing the driving force by the predetermined value ADDFDLM of driving force correction ADDFD will not subject the vehicle to acceleration exceeding 0.07 G. In this preferred implementation, the second predetermined value RES#TLEV2 takes a value equivalent to 14% gradient of road. By setting the maximum acceleration by ADDFD at about 0.07 G, occurrence of undesired rapid acceleration of the vehicle is prevented.

As readily seen from FIG. 3, there is no discrete change in ADDFD against any change in RESTRQ during operation of the vehicle, thus preventing occurrence of any considerable shock due to a change in ADDFD against any change in RESTRQ.

Turning back to FIG. 2, the CTDFG B40 receives ordinary target driving force tTd#n and driving force correction ADDFD and determines a corrected target driving force tTd by calculating a sum of tTd#n and ADDFD. The corrected target driving force tTd can be expressed as:

$$tTd = tTd\#n + ADDFD \quad (4).$$

The CTDFG B40 provides the determined tTd to the TETG B50 and also to the TRG B60.

The TETG B50 receives RATIO as well as tTd[N] and determines a target engine torque Te[N] (=tTe) after dividing tTd[N] by RATIO. The TETG B50 provides the determined Te[N] to a control section of the engine 1.

The TRG B60 receives VSP[m/s] as well as tTd[N] and determines a target speed ratio tRATIO using VSP[m/s] and tTd[N]. The TRG B60 has a memory storing a predetermined map that defines various values of target speed ratio tRATIO against various combinations of values of VSP and values of tTd. In determining the target speed ratio tRATIO, the TRGB60 performs a table look-up operation of this predetermined map using VSP and tTd. The TRG B60 provides the determined tRATIO to a control section of the transmission 2. Instead of target speed ratio tRATIO, a target input shaft speed may be determined and used as an input to the control section of the transmission 2.

FIG. 4 is a flow chart of a control routine implementing the present invention.

At step S11, the controller 3 inputs information of APO, VSP, GDATA, RATIO, TP, and NRPN.

At step S12, the controller 3 determines tTd#n by performing a table look-up operation, using APO and VSP, of the map illustrated in FIG. 2 within the box B10. At step S13, the controller 3 determines ENGTRQ by performing a table look-up operation, using TP and NRPN, of the map illustrated in FIG. 2 within the box B21. At step S14, the controller 3 calculates a product of ENGTRQ and RATIO to give TRQOUT.

At step S15, the controller 3 determines RLDTRG by performing a table look-up operation, using VSP, of the map illustrated in FIG. 2 within the box B12. At step 516, the controller 3 calculates a product of GDATA, WV, rTIRE, and zRATIO to give GTRQ.

At step S17, the controller 3 calculates a subtraction of (RLDTRQ+GTRQ) from TRQOUT to give RESTRQ. Using RESTRQ makes it possible to correct driving force to compensate for a drop in acceleration due to deterioration of torque transmission efficiency of the transmission 2. Explaining more in detail, if the torque transmission efficiency of the transmission 2 deteriorates, the actual output shaft torque becomes smaller than the calculated output shaft torque TRQOUT, causing a reduction in acceleration to reduce acceleration resistance GTRQ. Thus, the calculated RESTRQ becomes large as the torque transmission efficiency drops, making it possible to increase driving force to compensate for a drop in acceleration due to deterioration in torque transmission efficiency.

At step S18, the controller 3 determines ADDFD by performing a table look-up operation of FIG. 3 using RESTRQ.

At step S19, the controller 3 determines tTd by calculating a sum of ttd#n and ADDFD. At step S20, the controller 3 determines tTe by calculating (tTd/RATIO)×(rTIRE/zRATIO) and outputs, as a command to the engine 1, the determined tTe. At step S21, the controller 3 determines tRATIO by performing a table look-up operation, using tTd and VSP, of the map as illustrated in FIG. 2 within the box B60, and outputs, as a command to the transmission, the determined tRATTO.

From the preceding description, it is understood that the ordinary driving force tTd#n (step S12) is set as the corrected driving force tTd (step S19) during operation of the vehicle on a flat road with zero acceleration resistance GTRQ. This is because the running resistance increment RESTRQ becomes zero when the acceleration resistance GTRQ is zero. Under this running condition, the engine 1 and the transmission 2 are operated based on the ordinary driving force ttd#n obtained at step S12.

From the preceding description, it will now be appreciated that a change in running resistance causes the magnitude of driving force to be corrected in response to the running resistance increment RESTRQ, thus always providing an acceleration feel fit to the vehicle operator demand.

If RESTRQ is less than RES#TLEV1, ADDFD is zero (see FIG. 3). This prevents occurrence of undesired driving force correction during operation of the vehicle on a generally flat road or upon occurrence of error in calculating RESTRQ.

If RESTRQ becomes greater than RES#TLEV2, ADDFD is kept constant, preventing occurrence of rapid acceleration.

Figure 5:
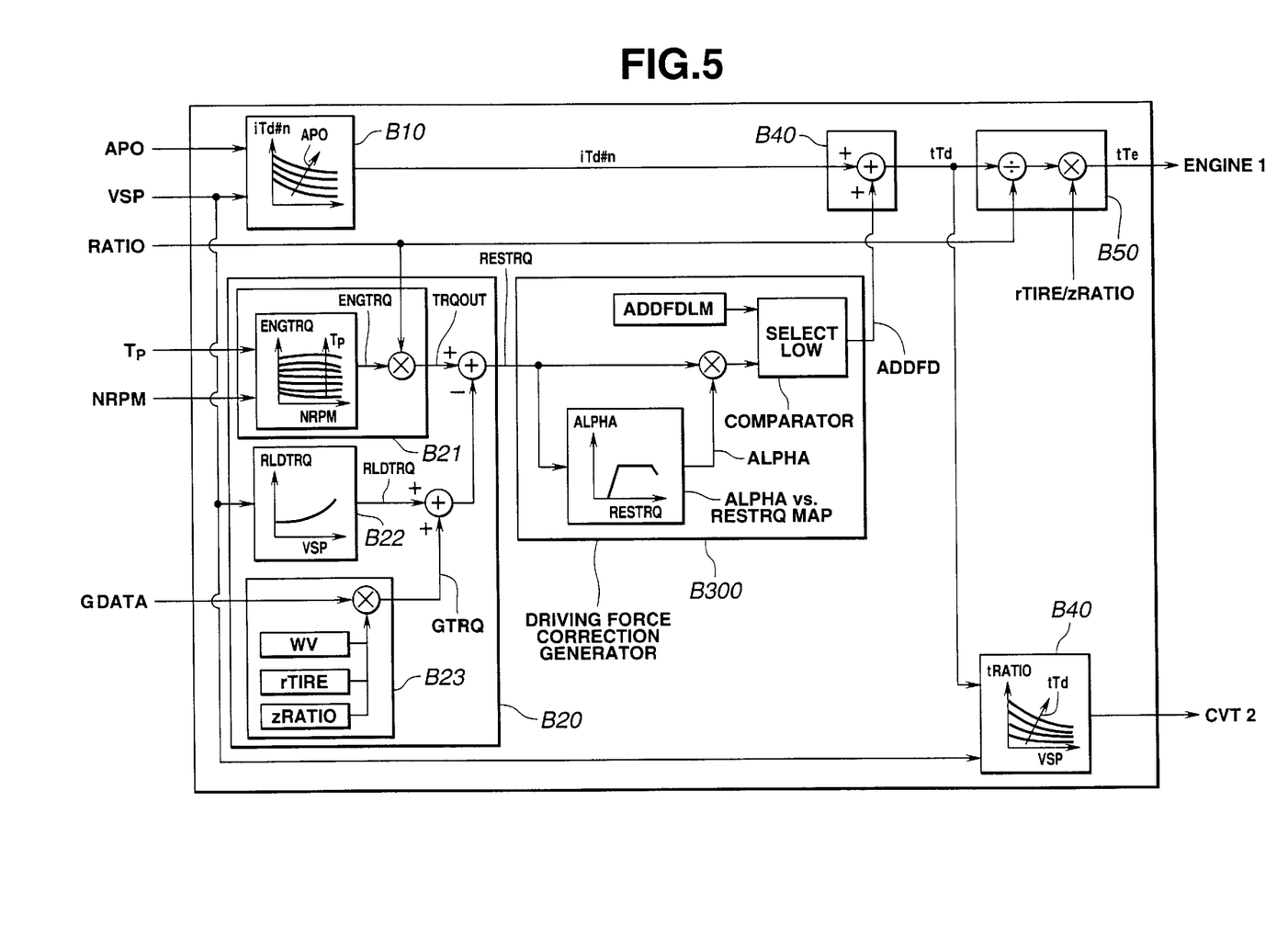
FIG. 5 is a control diagram illustrating another preferred implementation of the present invention.

FIG. 5 illustrates a second preferred implementation according to the present invention.

The second preferred implementation is substantially the same as the first preferred implementation except the provision of a DFCG B300 (see FIG. 5) instead of the DFCG B30 (see FIG. 2).

Similarly to the DFCG B30 of FIG. 2, the DFCG B300 determines a driving force correction ADDFD in response to the magnitude of a running resistance correction RESTRQ. The DFCG B300 calculates a ratio ALPHA[/m] of ADDFD to RESTRQ (ALPHA=ADDFD/RESTRQ) and determines ADDFD based on the ALPHA.

Figure 6:
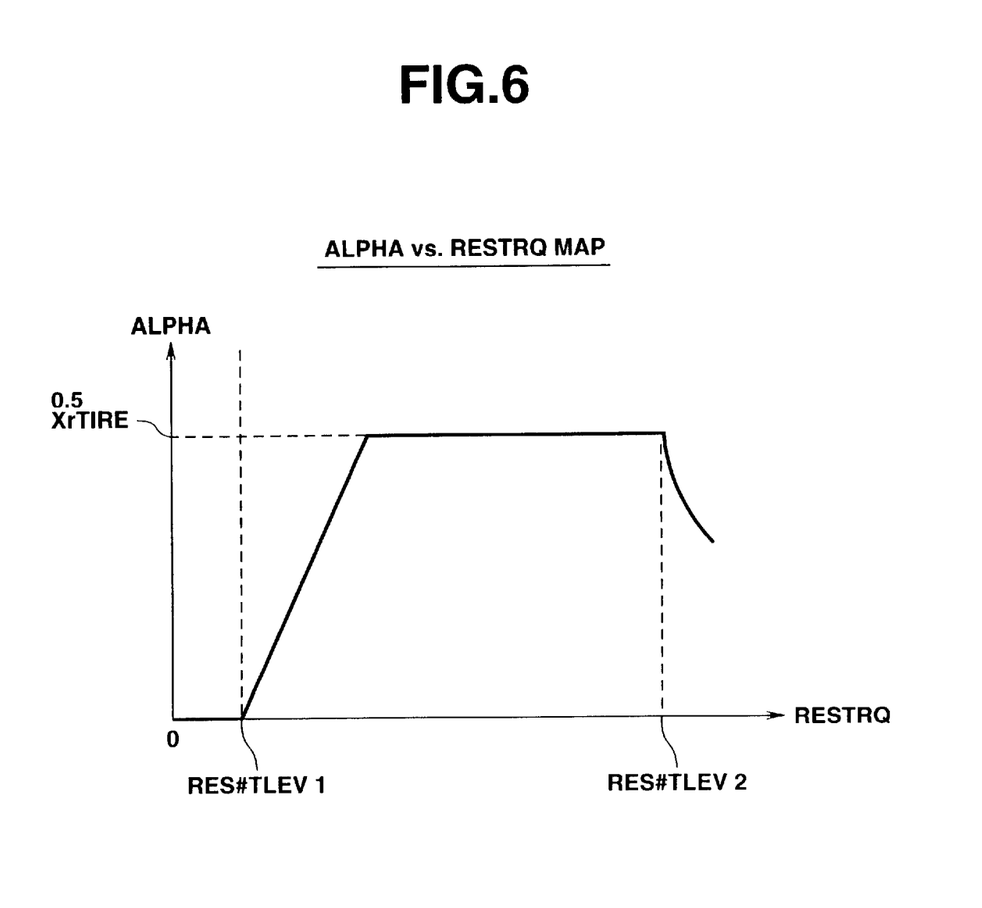
FIG. 6 is a graphical representation of a characteristic of variation of a ratio (ALPHA) against variation of an increment in running resistance (RESTRQ).

FIG. 6 is a table illustrating various values of ALPHA against various values of RESTRQ. The DFCG B300 performs a table look-up operation, using RESTRQ, of the table shown in FIG. 6 to determine ALPHA, and determines ADDFD by calculating the equation as follows:

$$ADDFD = RESTRQ \times ALPHA \tag{5}$$

Specifically, over values of RESTRQ not greater than a first predetermined value RES#TLEV1, the ALPHA is zero. The first predetermined value RES#TLEV1 takes any one of values, which are equivalent to 2% gradient of road. During operation of the vehicle when RESTRQ is less than or equal to the first predetermined value RES#TLEV1, no correction in driving force takes place. This prevents occurrence of any unexpected driving force correction due to, for example, an error in calculating RESTRQ, a small variation in wind against the vehicle or a small variation in running resistance derived from a gradual gradient change.

Next, over values of RESTRQ greater than RES#TLEV1 but not greater than a second predetermined value RES#TLEV2 that is equivalent to 14% gradient of road, the ALPHA is set equal to 0.5×rTIRE. That is ALPHA=0.5× rTIRE. In this case, 50% of RESTRQ is converted into ADDFD. The remaining portion of RESTRQ left unconverted is not translated into ADDFD, leaving a room for the vehicle operator to participate the driving force correction by depressing the accelerator pedal, thus providing a natural acceleration fit to the vehicle operator's demand.

Over values of RESTRQ greater than RES#TLEV2, the ALPHA gradually decreases toward zero as RESTRQ increases.

The determined ADDFD and a predetermined value ADDFDLM are compared and a lower one of them is selected and set as a new driving force correction ADDFD. Thus, the values of ADDFD are limited at ADDFDLM. By setting the maximum acceleration by ADDFDLM at about 0.07 G, occurrence of undesired rapid acceleration of the vehicle is prevented.

As seen from FIG. 6, the vertical axis of the table indicates a rate of conversion of RESTRQ to ADDFD, making it easier to recognize the conversion rate. This easy recognition of the conversion rate will facilitate final adjustment after its installation into a vehicle.

Figure 7:
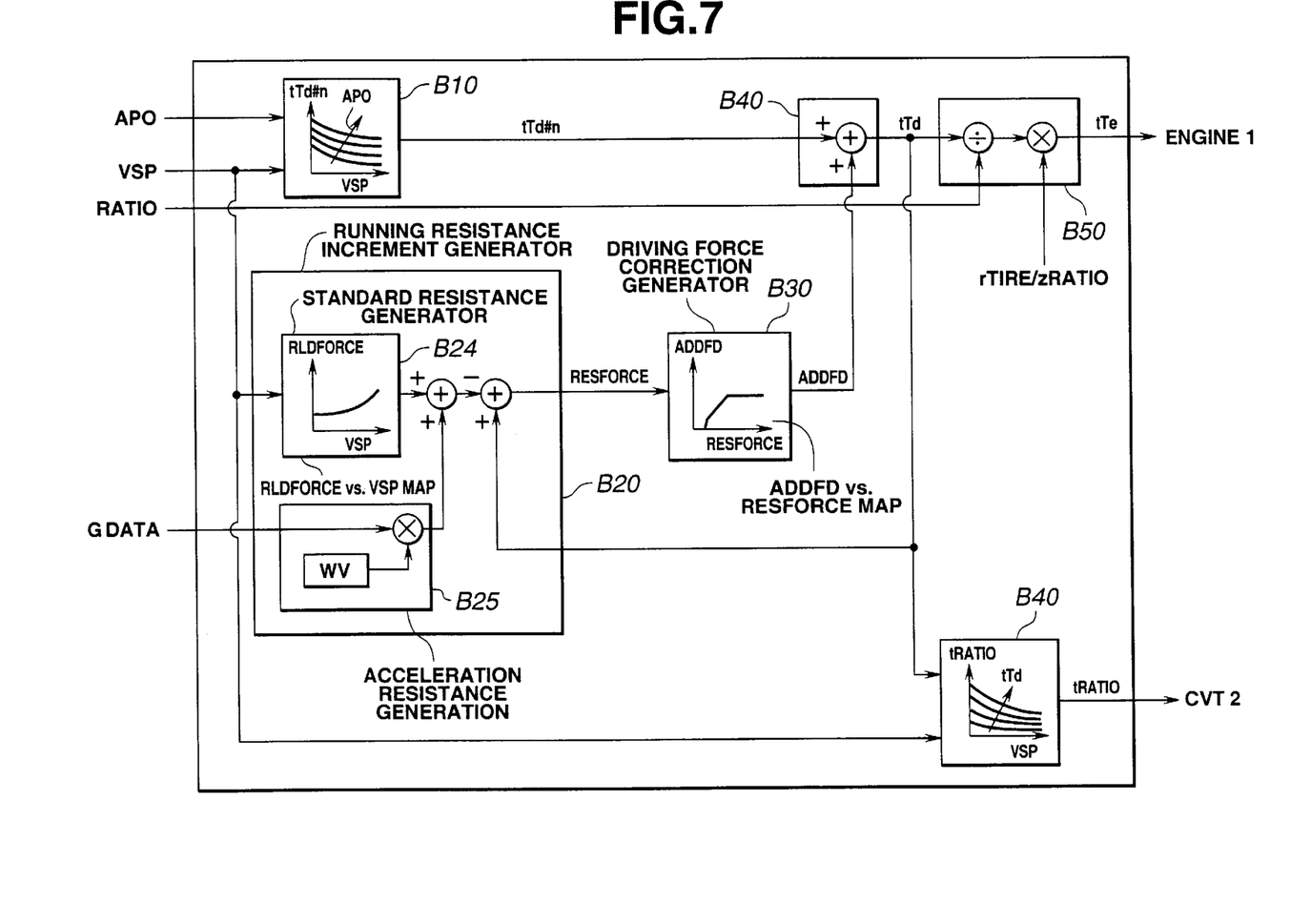
FIG. 7 is a control diagram illustrating still another preferred implementation of the present invention.

FIG. 7 illustrates a third preferred implementation according to the present invention.

The third preferred implementation is substantially the same as the first preferred implementation except the provision of a RRIG B200 instead of RRIG B20. Information as to VSP, GDATA, and tTd is used as inputs to the RRIG B200. The RRIG B200 provides, as an output, an increment in running resistance or a running resistance increment RESFORCE [N] to a DFCG B30. The running resistance increment RESFORCE [N] corresponds to the running resistance increment RESTRQ [Nm] of the first preferred implementation.

As shown in FIG. 7, the RRIG B200 includes a SRG B24 and an ARG B25. But, it does not include one corresponding to the EDFG B21 of the first preferred embodiment.

The SRG B24 inputs information as to vehicle speed VSP resulting from calculation on output shaft speed of the transmission 2. The SRG B24 includes a memory storing a predetermined table that defines various value of standard running resistance torque RLDFORCE [N] against various values of vehicle speed VSP. The value of TLDFORCE [N] becomes larger as the value of VSP becomes higher.

The ARG B25 inputs information as to vehicle acceleration GDA TA [m/s$^2$]. Information as to vehicle weight WV [kg] is stored as reference data in the ARG B25. The ARG B25 determines an acceleration resistance force GFORCE [N] as a product of GDATA and WV as expressed by the following equation;

$$GFORCE = GDATA \times WV \tag{6}$$

The ARG B25 calculates subtraction of GFORCE [N] from tTd [N] to give the running resistance increment RESFORCE [N]. The ARG B25 provides as its output the running resistance increment RESFORCE [N] to the DFCG B30.

The third preferred implementation does not need the EDFG B21 of the first preferred implementation, which estimates output shaft torque of the transmission 2. This reduces an operation load on the controller 3 and a considerable reduction in ROM capacity due to elimination of the map used in the EDFG 21.

In the preceding description, the running resistance increment generator (RRIG) B20 is described in connection with FIG. 2. For full understanding of the RRIG B20, reference should be made to a pending United States Patent Application NO. unassigned, filed by the inventors, entitled "Process of Forming Standard Resistance Values and Vehicle Control Using Same", and claims priority based on Japanese PatentApplication NO. 11-58291 filed in Japan on Mar. 5, 1999. This pending United States Patent Application is hereby incorporated by reference in its entirety and commonly assigned herewith. Particular reference is made to FIG. 2 illustrating a driving torque generator (DTG) 2, a standard resistance generator 3, and a summation point to make subtraction of RLDTRQ from TRQALL to give RESTRQ.

The above-identified United States Patent Application, which has been incorporated by reference, has a corresponding European Patent Application that claims priority based on Japanese Patent Application NO. 11-58291.

While the present invention has been particularly described, in conjunction with the preferred embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

The content of disclosure of Japanese Patent Application No. 11-58289, filed Mar. 5, 1999 is hereby incorporated by reference in its entirety.

What is claimed is:

1. A driving force control system for an automotive vehicle having an accelerator pedal, an engine, and an automatic transmission, comprising:

an ordinary target driving force generator generating ordinary target driving force in response to operator manipulation of the accelerator pedal and vehicle speed;

a running resistance increment generator including a standard resistance generator that generates standard resistance, said running resistance increment generator being operative to determine an increment in running resistance from said standard resistance;

a driving force correction generator converts said increment in running resistance into said driving force correction over a portion of variations of said increment in running resistance at a rate that is variable in response to said increment in running resistance;

a corrected driving force generator determining corrected target driving force by adding said driving force correction to said ordinary target driving force;

a target engine torque generator generating a target engine torque in response to said corrected target driving force; and a target ratio generator generating a target ratio in response to said corrected target driving force.

2. The driving force control system as claimed in claim 1, wherein said driving force correction generator is operative to set said driving force correction equal to zero over variation of said increment in running resistance less than a predetermined value.

3. The driving force control system as claimed in claim 1, wherein said driving force correction generator is operative to continuously vary said driving force correction over variation of said increment in running resistance.

4. The driving force control system as claimed in claim 1, wherein said driving force correction generator is operative to keep said driving force correction constant over variation of said increment in running resistance greater than a predetermined value.

5. The driving force control system as claimed in claim 1, wherein said driving force correction generator is operative to set said driving force correction equal to a predetermined percentage of said increment in running resistance, said predetermined percentage falling in a range from 30% to 70%.

6. The driving force control system as claimed in claim 1, wherein said running resistance increment generator is operative to determine acceleration resistance, and wherein said running resistance increment generator is operative to determine said increment in running resistance in response to said acceleration resistance.

7. The driving force control system as claimed in claim 1, wherein said running resistance increment generator is operative to determine driving torque and acceleration resistance, and wherein said running resistance increment generator is operative to determine said increment in running resistance by subtracting from said determined driving torque a sum of said standard resistance and said acceleration resistance.

8. The driving force control system as claimed in claim 1, wherein said running resistance increment generator is operative to vary said ratio of said driving force correction to said increment in running resistance in response to said increment in running resistance, and wherein said running resistance increment generator determines said driving force correction by multiplying said ratio with said increment in running resistance.

9. A driving force control process for an automotive vehicle having an accelerator pedal, an engine, and an automatic transmission, comprising:

generating ordinary target driving force in response to operator manipulation of the accelerator pedal and vehicle speed;

generating running resistance torque;

generating acceleration resistance torque;

generating standard resistance torque;

determining an increment in running resistance torque by subtracting from said running resistance torque a sum of said acceleration resistance torque and said standard resistance torque; determining driving force correction in response to said increment in running resistance;

converting said increment in running resistance into an driving force correction over a portion of variations of said increment in running resistance at a rate that is variable in response to the magnitude of said increment in running resistance;

determining corrected target driving force by adding said driving force correction to said ordinary target driving force;

generating a target engine torque in response to said corrected target driving force; and generating a target ratio in response to said corrected target driving force.

10. A driving force control system for an automotive vehicle having a power train including an internal combustion engine and a continuously variable transmission (CVT), and a controller that determines an increment in running resistance derived from road gradient, determines a driving force correction in response to the determined increment in running resistance, and corrects a target driving force applied to the power train with the driving force correction, wherein said controller determines said driving force correction in response to operator demand on motion of the automotive vehicle relative to the surface of a road as well as said increment in running resistance.

11. The driving force control system as claimed in claim 10, wherein, over a portion of the whole variations of said increment in running resistance, said controller converts said increment in running resistance into said driving force correction at a rate.

12. The driving force control system as claimed in claim 10, wherein, over a portion of the whole variations of said increment in running resistance lower than a first predetermined value, said controller keeps said driving force correction zero.

13. The driving force control system as claimed in claim 10, wherein, over a portion of the whole variations of said increment in running resistance greater than a second predetermined value, said controller keeps said driving force correction at a predetermined value.

* * * * *